United States Patent [19]

Marzola et al.

[11] Patent Number: 5,656,374
[45] Date of Patent: Aug. 12, 1997

[54] POLYOLEFIN COMPOSITIONS SUITABLE FOR SHEETS AND FILMS WHICH ARE SEALABLE BY RADIO-FREQUENCY

[75] Inventors: Roberto Marzola; Luca Scanavini, both of Ferrara, Italy

[73] Assignee: Montell North America Inc., Wilmington, Del.

[21] Appl. No.: 469,246

[22] Filed: Jun. 6, 1995

[30] Foreign Application Priority Data

Jun. 20, 1994 [IT] Italy .................. MI94A1287

[51] Int. Cl.$^6$ .................. B32B 5/16; B23B 27/00
[52] U.S. Cl. .................. 428/402; 428/474.4; 428/476.3; 428/500; 428/515; 428/516; 525/240; 525/299; 525/323; 525/322
[58] Field of Search .................. 428/500, 515, 428/516, 402, 474.4, 476.3; 525/240, 322, 323, 299

[56] References Cited

U.S. PATENT DOCUMENTS

| | | | |
|---|---|---|---|
| 4,350,797 | 9/1982 | Marzola et al. | 525/293 |
| 4,568,428 | 2/1986 | Rigg et al. | 203/91 |
| 5,286,564 | 2/1994 | Cecchin et al. | 428/402 |
| 5,300,365 | 4/1994 | Gale | 428/461 |

*Primary Examiner*—Leszek Kiliman

[57] ABSTRACT

Polyolefin compositions, capable of developing substantial dielectric heat including (percent by weight):

(I) 85–97% of a heterophasic olefin polymer optionally modified with polar monomers in amount from 0.3 to 0.03% of the heterophasic olefin polymer; and (II) 3–15% of at least one polymer having a dielectric heat loss factor greater than or equal to 0.01.

7 Claims, No Drawings

POLYOLEFIN COMPOSITIONS SUITABLE FOR SHEETS AND FILMS WHICH ARE SEALABLE BY RADIO-FREQUENCY

FIELD OF THE INVENTION

The present invention relates to polyolefin compositions suitable for the manufacture of sheets and films which are sealable with dielectric heat generated by radio-frequency.

BACKGROUND OF THE INVENTION

Published European patent application 472946 describes a polyolefin composition characterized, among other things, by a high flexibility properties (flexural modulus lower than 150 MPa), and comprising a crystalline propylene homopolymer or copolymer, and certain amounts of an elastomeric olefin copolymer soluble in xylene at ambient temperature, which elastomeric olefin copolymer contains less than 40% by weight of ethylene and has an intrinsic viscosity from 1.5 to 4 dl/g.

U.S. Pat. No. 5,300,365 teaches that the above composition is suitable for the manufacture of sheets and films that are substantially gel free and possess excellent physical-mechanical properties.

A method is known in the art for sealing sheets or films of plastic materials, such as for example, vinyl polymers, polyamides, polyesters and polyurethanes, with dielectric heat by radio-frequencies. This method, referred to as the radio-frequency sealing method, consists of placing portions of two or more sheets or films of the above mentioned materials between two electrodes to which is applied an electrical potential difference oscillating at a radio frequency (1–200 MHz), while applying a pressure to the portions of the sheets or films where the sealing is to take place. The heat thus generated in the portions of the polymer sheets or films contacted causes the melting of those portions and allows those portions to adhere and seal. However, this method is not effective to seal sheets or films made of olefin polymers to each other, since such polymers generally develop little dielectric heat in electromagnetic fields at radio frequencies.

In fact, polyolefin films or sheets generally are sealed by applying external heat directly to the portions that must be sealed. However, the seal cycles are longer and the seals thus obtained are non-uniform and of poor quality, when compared with the seal cycles of a radio-frequency apparatus and the seals thereby obtained.

Therefore, it would be a great advantage to have a polyolefin composition with physical-mechanical properties (particularly as to flexibility) substantially the same as those of the composition described in the above mentioned published European patent application 472946, and useful to be converted into sheets and films sealable with dielectric heat generated by radio frequencies.

This invention provides such a composition by melt blending a composition of the type described in the above mentioned European patent application 472946 with a minor amount of at least one polymer capable of developing heat by absorption of radio-frequency electromagnetic radiation.

SUMMARY OF THE INVENTION

The polyolefin composition of this invention comprises (percent by weight):

(I) 85–97%, preferably 90–95%, more preferably 92–95%, of a heterophasic olefin polymer comprising:

A) 5–50% of a crystalline propylene homopolymer, a crystalline copolymer of propylene and ethylene, a crystalline copolymer of propylene, ethylene and a $CH_2$=CHR α-olefin, wherein R is a $C_2$-$C_8$ alkyl radical, said copolymer containing more than 85% of propylene, or blends thereof;

B) 0–20% of a crystalline copolymer fraction of ethylene with propylene or with a $CH_2$=CHR α-olefin, wherein R is a $C_2$-$C_8$ alkyl radical, or both, said fraction being insoluble in xylene at ambient temperature;

C) 40–95% of an elastomeric copolymer fraction of ethylene with propylene or with a $CH_2$=CHR α-olefin, wherein R is a $C_2$-$C_8$ alkyl radical, or both, and optionally with minor amounts of a diene, said copolymer fraction containing ethylene in an amount smaller than 40%, preferably from 20 to 38%, and being soluble in xylene at ambient temperature;

said heterophasic olefin polymer being optionally modified with at least one polar monomer in an amount from 0.03 to 0.3%, preferably from 0.05 to 0.2%, of the heterophasic olefin polymer; and (II) 3–15%, preferably 5–10%, more preferably 5–8%, of at least one polymer having a dielectric heat loss factor of at least 0.01.

The above mentioned polyolefin composition is convertable into sheets and films that are sealable with dielectric heat generated by radio-frequencies and are free of gels and surface irregularities in spite of the presence of the additional component (II). Moreover, said composition has physical-mechanical properties, flexibility in particular, completely similar to those of the composition described in published European patent application 472946. Consequently the sheets and films obtained from the composition of the present invention are particularly useful for use in packaging as well as for other applications that require high flexibility, softness and dielectric heat sealability.

DETAILED DESCRIPTION OF THE INVENTION

Examples of the heterophasic olefin polymer (I) are described in published European patent application 472946 (corresponding to U.S. Ser. No. 734,390, filed on Jul. 23, 1991, now U.S. Pat. No. 5,286,564, the content of which is incorporated herein by reference).

As a way of example the total amount of ethylene in heterophasic copolymer (I) is 15% to 35% by weight. Moreover, the intrinsic viscosity of fraction (C) generally is 1.5 to 4 dl/g.

Preferably the amount of ethylene in fraction (B) is at least 75% by weight, more preferably at least 80% by weight, with respect to the total weight of (B).

Examples of $CH_2$=CHR α-olefin, where R is a $C_2$-$C_8$ alkyl radical, that can be present in heterophasic copolymer (I) are 1-butene, 1-pentene, 4-methyl-1-pentene, 1-hexene and 1-octene.

When present, the diene units in fraction (C) of (I) are preferably in an amount from 1% to 10% by weight with respect to the total weight of (C). Examples of dienes are butadiene, 1,4-hexadiene, 1,5-hexadiene and ethylene-1-norbornene.

The above mentioned heterophasic olefin polymer (I) can be prepared by melt blending fractions (A), (B), and (C) in the fluid state, that is at temperatures higher than their softening or melting point, or by sequential polymerization in two or more stages in the presence of a highly stereospecific Ziegler-Natta catalyst.

Examples of sequential polymerization processes are described in published European patent application 472946

(corresponding to U.S. Ser. No. 734,390, filed on Jul. 23, 1991, now U.S. Pat. No. 5,286,564 the content of which is incorporated herein by reference). When the heterophasic olefin polymer (I) is prepared by sequential polymerization, fraction (B) is present in an amount greater than or equal to 1% by weight. When said fraction (B) is present, it is preferable that the (B)/(C) weight ratio be less than 0.4. It is also preferable that the weight percent of fraction (C), or of the sum of fractions (B) and (C), be from 50% to 90%, preferably from 65% to 80%, with respect to heterophasic olefin polymer (I). Generally the heterophasic olefin polymer (I) has at least one melt peak, determined by differential scanning calorimetry (DSC), at a temperature higher than 120° C., such as a temperature from 130° C. to 150° C., and at least one melt peak, relative to the glass transition temperature, at a temperature from −10° C. to −35° C.

Moreover, said heterophasic olefin polymer has a flexural modulus lower than 150 MPa, and does not break during the Izod impact test at −50° C. Other properties preferably present in heterophasic olefin polymer (I) are yield point from 3 to 20 MPa; tensile strength from 10 to 20 MPa; elongation at break greater than 300%; tension set, at 75% elongation, from 20 to 50%; and a Shore D hardness from 20 to 35.

The heterophasic olefin polymer (I) can be modified with at least one polar monomer using a variety of methods. For example, one can graft at least one polar monomer onto a propylene polymer backbone by using free radical initiators, such as organic peroxides, according to known methods, such as those described in U.S. Pat. Nos. 4,350,797 and 4,568,428. The thus obtained modified propylene polymer (hereinafter referred to as "modifying polymer") is then blended in the molten state with the heterophasic olefin polymer (I). However, it is preferable to treat the propylene polymers in the particulate form, i.e. powders, flakes, spherical or spheroidal particles, with the polar monomers and radical initiators as described in published European patent application 572028 (corresponding to U.S. Ser. No. 68,012 filed on May 27, 1993, the content of which is incorporated herein by reference). Also in this case the modifying polymer thus obtained is blended in the molten state with the heterophasic olefin polymer (I).

In both these cases the amount of polar monomer generally is from 0.05 to 30% by weight, preferably from 0.02 to 10% by weight, of the total weight of the modifying polymer, while the amount of free radical initiator, preferably an organic peroxide, is from 0.008 to 6% by weight, preferably from 0.04 to 2% by weight, of the total weight of the modifying polymer.

The propylene polymer used in the preparation of said modifying propylene polymer can be the same as one of the fractions (A), (B), and (C) described for the heterophasic olefin polymer (I), or a mixture thereof. However, it is not necessary that the propylene polymer used in the preparation of said modifying propylene polymers be identical to one of the fractions contained in the heterophasic olefin polymer (I) before the modification. Preferably, the propylene polymer is of the same type as that of fraction (A), or a heterophasic olefin polymer of the same type as the heterophasic olefin polymer (I), i.e. comprising fractions (A), (C), and optionally (B).

At any rate, by carefully selecting the amount of the above mentioned modifying polymer that is added to the heterophasic olefin polymer (I), a heterophasic olefin polymer (I) modified with polar monomers and having the composition described above is obtained.

It is also possible to blend the polar monomer(s) and radical initiator(s) directly with the heterophasic olefin polymer (I) in the molten state. Such blending step in the molten state is carried out according to any of the known techniques, preferably operating in an inert atmosphere, such as under nitrogen, and with conventional equipment, such as internal mixers or single or twin-screws extruders. The blending temperature is preferably 180° C. to 220° C.

Examples of polar monomers are maleic anhydride, acrylic acid, methacrylic acid, acrylic acid esters, methacrylic acid esters, acrylonitrile, methacrylonitrile, maleic acid, fumaric acid, vinyl chloride or vinyl acetate. The preferred polar monomer is maleic anhydride.

Examples of free radical initiators are benzoyl peroxide, di-tert-butyl peroxide, dicumyl peroxide, tert-butyl perbenzoate, 2,5-dimethyl-2,5-bis(tert-butyl peroxy)hexane, 2,5-dimethyl-2,5-bis(tertbutyl peroxy) 3-hexyne, and azobisisobutyronitrile.

Concerning component (II), the dielectric heat loss factor is a nondimensional quantity which is equal to the dielectric constant of the polymer material times the dissipation factor of said polymer material. The polymer dissipation factor is a function of the fraction of absorbed energy that is converted into heat by the polymer material.

Examples of polymers with a dielectric heat loss factor of at least 0.01 include polyamides, vinyl polymers, polyesters and polyurethanes. Preferred are polyamides. Particularly preferred are polyamides selected from the crystalline or amorphous polyamides having a number average molecular weight greater than or equal to 1000, preferably greater than or equal to 5000, generally from 10000 to 30000.

As a way of example said polyamides can be obtained:
a) by polycondensation of carboxylic acids having 4–12 carbon atoms with diamines having 4–14 carbon atoms; or
b) by polymerizing cyclic lactams having 6–12 carbon atoms.

Specific examples of polyamides include nylon 6 (polycaprolactam), 66, 69, 610 or 612, or polycondensates of hexamethylenediamine, adipic acid, and phthalic and terephthalic acid or mixtures thereof.

Generally polymer (II) is preferably present in the composition of the present invention as dispersed particles having a diameter from 0.05 to 0.7 micrometers, measured by electron microscopy. Usually said particles are spheroidal.

In addition to the above components, the composition of the present invention can contain additives commonly used in polymer materials, such as stabilizers, pigments and fillers.

To obtain the composition of the present invention, components (I) and (II), and the additives optionally used, are melt blended, i.e. with the polymers being in the molten state, according to any of the known techniques, preferably operating in an inert atmosphere, such as under nitrogen for example. Such blending can be carried out by using conventional equipment, such as internal mixers (such as Banbury), or single or twin-screws extruders (such as Buss). The temperature of the melt blending preferably is from 190° C. to 250° C.

In general the composition of the present invention has a flexural modulus lower than or equal to 250 MPa, and Shore D hardness lower than 40.

As previously stated, the composition of the present invention can easily be used to manufacture sheets and films.

As used herein film is a layer having a thickness of less than 100 micrometers, while sheet is a layer having a thickness greater than or equal to 100 micrometers. Both sheets and films can be single- or multilayer. Multilayer films and sheets are commonly referred to as laminates. The single layer films or sheets or at least one of the layers of the multilayer films or sheets comprise the composition of the present invention. In the case of multilayer sheets or films, the layers that do not comprise the composition of the present invention can comprise olefin polymers, such as polyethylene or polypropylene homopolymer. Generally, the above mentioned sheets and films can be prepared by known techniques, such as extrusion and calendering. In radio frequency sealing such sheets and films it is preferable to preheat the electrodes at a temperature from 40° C. to 100° C.

The following example is given to illustrate, but not limit the present invention.

The methods used to obtain the property data reported in the example and description are identified below. For the test methods requiring molded specimens, the specimens have been obtained from 170×70'3 mm plates of the composition to be measured molded with an injection press at 150°–180° C. The above specimens were cut out parallel to the polymer flow lines of the plates.

| Property | Method |
| --- | --- |
| Melt Flow Rate (M.F.R) | ASTM-D 1238 Condition L |
| Ethylene percent by weight | I.R. Spectroscopy |
| Intrinsic viscosity | Determined in tetrahydronaphthalene at 135° C. |
| Xylene soluble fraction | (see note below) |
| Tensile strength | ASTM D-638 |
| Elongation at break | ASTM D-638 |
| Vicat (1 kg) | ASTM D-1525 |
| Hardness (Shore D) | ASTM D-2240 |
| Flexural Modulus at 23° C. | ASTM D-790 |
| Compression set | ASTM D 395, method B |

Note

DETERMINATION OF THE PERCENT OF XYLENE SOLUBLE FRACTION

A solution of the sample in xylene at a concentration of 1% by weight is prepared and kept at 135° C. for one hour while stirring.

The solution is allowed to cool to 95° C., while stirring, after which it is poured into a thermostatic bath at at 25° C., where it is kept for 20 minutes without stirring, and for 10 minutes under stirring. The solution is then filtered, and acetone is added to an aliquot of the filtrate to cause the polymer dissolved therein to precipitate. The polymer thus obtained is recovered, washed, dried and weighed to determine the weight of xylene soluble.

EXAMPLE

This example illustrates an embodiment of the olefin polymer composition of this invention, a process for preparing same, a sheet of the composition and the sealing of the sheet. 97% by weight of an unmodified heterophasic olefin polymer (I) was melt blended with 3% by weight of a modifying polymer in a nitrogen atmosphere at 200° C. in a Brabender single-screw extruder.

The heterophasic olefin polymer was in the form of spheroidal particles having an average diameter of 2.5 mm, and having the following fractions (percent by weight):

A) 32% of a crystalline propylene/ethylene copolymer containing about 4% of ethylene.

B) 3% of an essentially linear ethylene/propylene copolymer insoluble in xylene at ambient temperature, and containing about 15% of propylene;

C) 65% of an amorphous propylene/ethylene copolymer soluble in xylene at ambient temperature, having an intrinsic viscosity in tetrahydronaphthalene at 135° C. of 2.95 dl/g, and containing 30% of ethylene.

The above mentioned heterophasic olefin polymer had the following properties, measured by the methods described above:

| | |
| --- | --- |
| M.F.R. (dg/min) | 0.6 |
| Tensile strength (MPa) | >8 |
| Elongation at break (%) | >350 |
| Vicat (°C.) | 55 |
| Shore D (pts) | 30 |
| Flexural modulus (MPa) | 70 |
| Compression set (%) (22 h - 70° C.) | 87 |

The modifying polymer comprised a backbone olefin polymer material of the above mentioned heterophasic olefin polymer on the particles of which were deposited the following compounds (percent by weight):

5% maleic anhydride;

1% Luperox 101 2,5-dimethyl-2,5-bis(tertbutylperoxy) hexane.

90 parts by weight of the modified heterophasic olefin polymer (I) thus obtained were blended under nitrogen atmosphere at 240° C. in a Brabender single-screw extruder, with 10 parts by weight of Ternyl B27 polyamide (nylon 6) (component II), having a molecular weight of 20,000, marketed by SNIA.

The polyamide in the resulting composition was in the form of dispersed spheroidal particles having a diameter from about 0.07 to 0.7 micrometers, as measured by electron microscopy. Moreover, the resulting composition had the following properties:

| | |
| --- | --- |
| M.F.R. (dg/min) | 1.7 |
| Tensile strength (MPa) | >11 |
| Elongation at break (%) | >370 |
| Vicat (°C.) | 59 |
| Shore D (pts) | 32 |
| Flexural modulus (MPa) | 110 |

The composition prepared as described above was converted into a sheet with a thickness of 200 micrometers by extruding it at 230°–250° C. through a flat die of a single-screw Brabender extruder having a screw length/diameter ratio of 20. The resulting sheet was folded over and sealed to itself with a radio-frequency sealing apparatus with a heatable electrode operating at 27 MHz and equipped with a pressure roller with end-of-run micrometric stop.

The sealing conditions were as follows:

Electrode current intensity: 0.7 A

Roller pressure: 10–30 Kg/cm$^2$

Temperature of heatable electrode: 40°–60° C.

Sealing time: 2–5 seconds.

The seal thus obtained was uniform and without burrs along the entire sealed portion surface. When subjected to manual peeling, the two edges of the sealed sheet tore in the areas adjacent to the seal, but not in the sealed area.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

We claim:

1. A polyolefin composition consisting essentially of, percent by weight:
(I) 85–97% of a heterophasic copolymer comprising:
  A) 5–50% of a crystalline propylene homopolymer, a crystalline copolymer of propylene and ethylene, a crystalline copolymer of propylene, ethylene and a $CH_2$=CHR α-olefin, wherein R is a $C_2$-$C_8$ alkyl radical, said crystalline copolymer containing more than 85% of propylene, or blends thereof;
  B) 0–20% of a crystalline copolymer fraction of ethylene with propylene or with a $CH_2$=CHR α-olefin, wherein R is a $C_2$-$C_8$ alkyl radical, or both, said fraction being insoluble in xylene at ambient temperature;
  C) 50–95% of an elastomeric copolymer fraction of ethylene with propylene or with a $CH_2$=CHR α-olefin, wherein R is a $C_2$-$C_8$ alkyl radical, or both, and optionally with minor amounts of a diene, said copolymer fraction containing ethylene in an amount smaller than 40%, and being soluble in xylene at ambient temperature;

said heterophasic copolymer optionally modified with at least one polar monomer in an amount from 0.03 to 0.3% of the heterophasic copolymer; and (II) 3–15% of at least one polymer having a dielectric heat loss factor of at least 0.01.

2. The composition of claim 1 consisting essentially of 90–95% by weight of component (I) and 5–10% by weight of component (II).

3. The composition of claim 1, wherein component (I) is modified with maleic anhydride.

4. The composition of claim 1, wherein component (II) is a polyamide.

5. The composition of claim 1, wherein component (II) is in the form of particles having a diameter from 0.05 to 0.7 micrometers.

6. Sheet or film comprising the composition of claim 1.

7. Multilayer sheet or multilayer film wherein at least one layer comprises the composition of claim 1.

* * * * *